T. LUMSDEN.
TOOL HOLDER FOR TOOL GRINDING MACHINES.
APPLICATION FILED APR. 6, 1914.
1,133,651.
Patented Mar. 30, 1915.
2 SHEETS—SHEET 1.
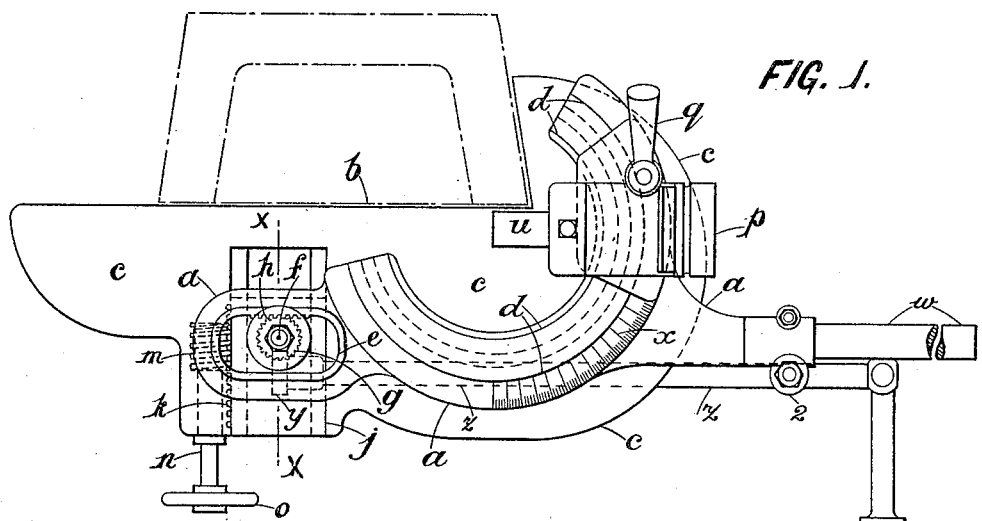
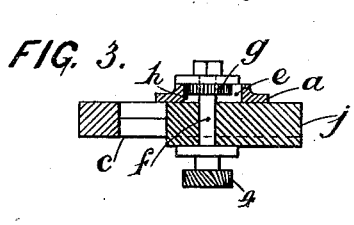
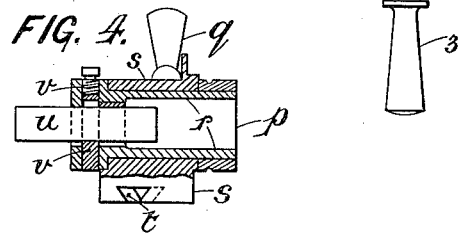
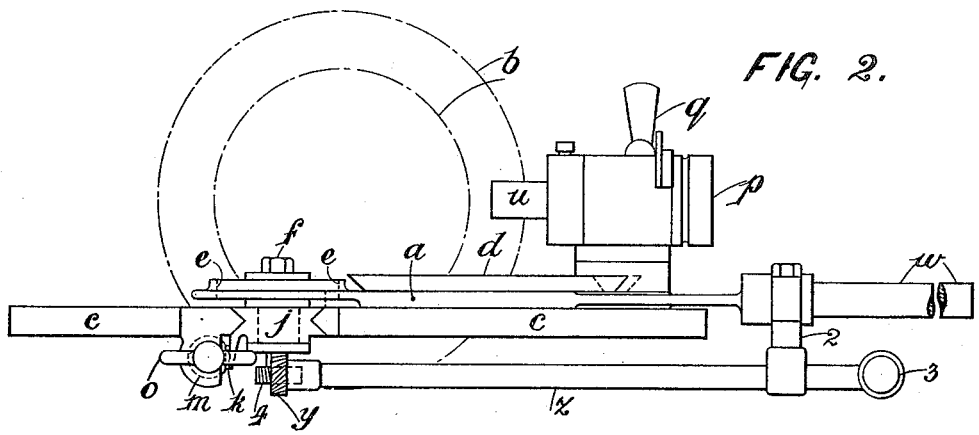
WITNESSES:
John C. Sanders
H. B. Cottrell
INVENTOR:
Thomas Lumsden
BY Wm Wallace White
ATT'Y

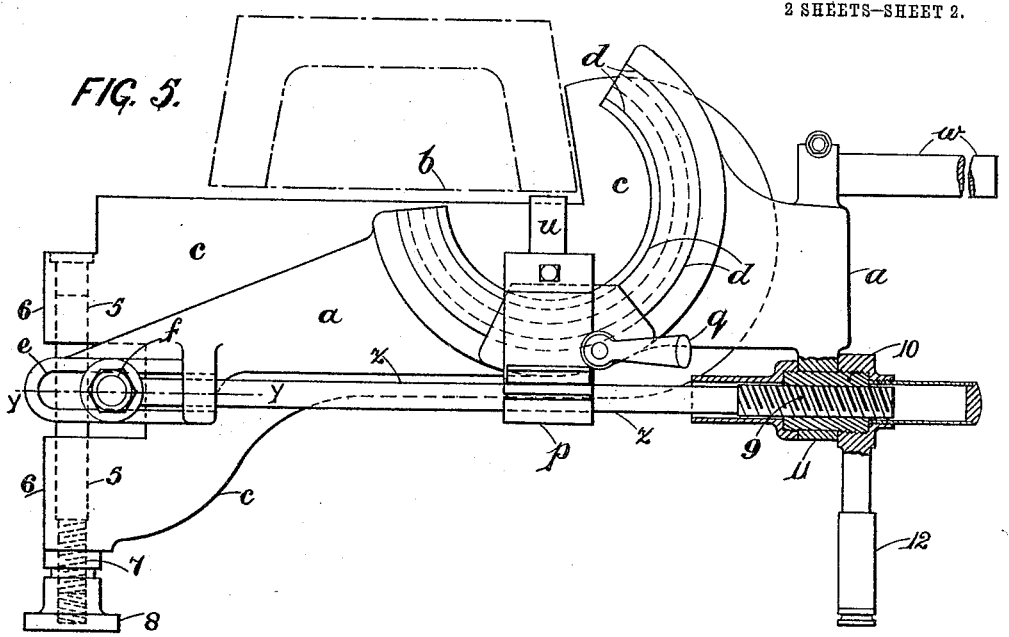
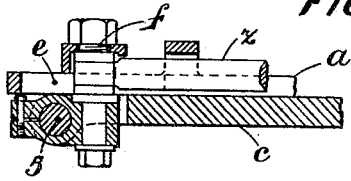
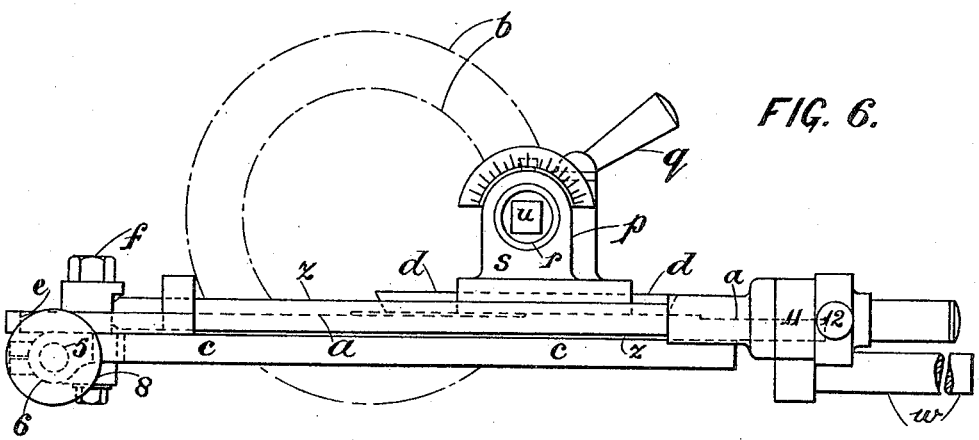

UNITED STATES PATENT OFFICE.

THOMAS LUMSDEN, OF GATESHEAD, ENGLAND.

TOOL-HOLDER FOR TOOL-GRINDING MACHINES.

1,133,651.  Specification of Letters Patent.  Patented Mar. 30, 1915.

Application filed April 6, 1914. Serial No. 829,794.

*To all whom it may concern:*

Be it known that I, THOMAS LUMSDEN, a subject of the King of Great Britain and Ireland, residing at Coulthard's Lane, East street, Gateshead, in the county of Durham, England, have invented new and useful Improvements in Tool-Holders for Tool-Grinding Machines, of which the following is a specification.

This invention relates to tool-holders for tool-grinding machines, and has for its object to provide a simple, light and cheap construction of tool-holder capable of all the necessary adjustments for the efficient grinding of machine tools and similar work.

A tool-holder in accordance with this invention comprises a lever carrying a tool-box or chuck and adapted to be reciprocated transversely across the cutting edge or face of the grinding disk or wheel, said tool-box or chuck being adapted to be turned about either of two axes perpendicular to the plane in which it and the lever are reciprocated to bring the tool to be ground up to the cutting edge of the grinding disk or wheel and to vary the angle at which the tool is presented to the grinding disk or wheel. Supplementary means are provided for reciprocating the lever and tool-box or chuck to travel the tool to be ground transversely across the cutting edge or face of the grinding disk or wheel, and means are also provided for adjusting one of the axes about which said tool-box or chuck turns toward and away from the cutting edge or face of the grinding disk or wheel.

I will fully describe my invention with reference to the accompanying drawings wherein—

Figure 1 is a plan of one form of tool-holder in accordance with my invention; Fig. 2 is a front elevation of Fig. 1; Fig. 3 is a section on the line X—X in Fig. 1; and Fig. 4 is a section of the tool-box or chuck. Figs. 5 and 6 are similar views to Figs. 1 and 2 respectively illustrating a modified form of the tool-holder; and Fig. 7 is a part section of Fig. 5 on the line Y—Y therein.

Referring to Figs. 1 to 4 of the drawings, I provide a lever $a$ extending across the front of the grinding disk or wheel, the position of which is indicated by the dot-and-dash lines $b$, and bearing on a fixed plate or table $c$ supported from the pan of the grinding machine. The lever $a$ is provided with a curved slide $d$ and a rectilinear slot $e$. The rectilinear slot $e$ engages a pivot $f$ provided on the table $c$ at one side of the grinding disk. On the pivot $f$ is mounted a pinion $g$ adapted to engage the teeth of a rack $h$ provided on one edge of the slot $e$, said pivot and pinion being carried by a block $j$ adapted to slide in a suitable slot in the table $c$. The block $j$ is provided at one side with a rack $k$ with which engages a worm $m$ mounted on a spindle $n$ provided with a handle $o$ by which said worm $m$ may be rotated to move or adjust the block $j$, pinion $g$ and pivot $f$ toward and away from the grinding disk $b$. The curved slide $d$ is in the form of an arc struck from a center approximating in position to that of the point of the tool to be ground. Mounted and adapted to slide on the curved slide $d$ of the lever $a$ is a tool-box or chuck $p$ of any convenient pattern provided with clamping means $q$ whereby it may be clamped in any desired position on the slide $d$. The tool-box illustrated comprises (as shown best in Fig. 4) a barrel $r$ mounted in a carrier $s$ which is provided with a curved slot $t$ engaging the slide $d$. The tool $u$ is clamped in the barrel $r$ by means of a ring or eye-bolt $v$. The barrel $r$ can be rotated within the carrier $s$ to allow of the tool $u$ being turned upon its axis to present the desired side face of the tool to the cutting edge of the grinding disk. The lever $a$ is provided with an extension $w$ forming a handle by which it may be moved.

In use the tool $u$ to be ground is clamped in position in the tool-box as indicated, and the tool-box is then adjusted on the curved slide $d$ to present the point of the tool at the required angle to the cutting edge or face of the grinding disk. A scale $x$ may be provided around the curved slide $d$ to indicate the exact angle to which the tool-box $p$ and tool $u$ have been adjusted. The tool $u$ can now be brought up to the cutting edge of the grinding disk by rotating the lever $a$ by means of its handle $w$ about the pivot $f$, and the tool can be traveled across the cutting edge by reciprocating the lever $a$ on its pivot $f$, the pinion $g$ of which co-acts with the rack $h$ of the slot $e$. The pinion $g$ is kept in engagement with the rack $h$ during grinding by the pressure which the operator exerts upon the handle $w$ of the lever $a$ to keep the tool against the grinding disk, the point of the tool forming the fulcrum of the lever $a$ during grinding.

Supplementary means may be provided for reciprocating the lever $a$ transversely across the cutting edge of the grinding disk $b$ such means comprising, for example, a spiral gearing $y$ mounted on a spindle $z$ supported by a bracket 2 from the handle $w$ of the lever $a$ and adapted to be rotated by a handle 3 to rotate a complementary spiral wheel 4 on the spindle of the pinion $g$ of the pivot $f$ which co-acts with the rack $h$ of the slot $e$ to reciprocate the lever $a$. When it is desirable that the side of the tool $u$ shall be parallel with the cutting edge of the disk $b$ during grinding, the pivot $f$ can be adjusted to carry the lever $a$, tool-box $p$ and tool $u$ toward or away from the disk $b$, as required, by operating the handle $o$ to rotate the worm $m$ which co-acts with the rack $k$ on the block $j$ to move said block and pivot $f$ toward or away from the disk $b$. A line or mark may be provided on the table $c$ to indicate when the lever $a$ is parallel to the face of the grinding disk $b$, and, if desired stops may be provided to limit the rotation or oscillation of the lever $a$. As the center from which the curved slide $d$ of the lever $a$ is struck is approximately the point of the tool $u$, the adjustment of the tool-box $p$ on the curved slide $d$ will not alter the distance of the point of the tool from the cutting edge of the grinding disk, but will only alter the angle at which the tool is presented to the cutting edge.

As will be obvious, instead of providing the lever $a$ with a curved slide such as $d$, I may provide it with a curved slot with which a projection on the tool-box will be adapted to co-act.

Should the grinding machine to which the tool-holder is fitted be required for other purposes than grinding tools, the tool-holder can be readily removed from the plate $c$ either by removing the nut and washer which retain the lever $a$ upon the pivot $f$ or by sliding the block $j$ from the slot in the plate $c$.

Figs. 5, 6 and 7 illustrate a modified form of tool-holder in accordance with my invention. In this construction I dispense with the pinion $g$ and rack $h$, and firmly secure the pivot $f$ to a horizontal pin 5 which is mounted in brackets 6, 6 provided at one end of the table $c$. One end of the pin 5 is threaded as indicated at 7, and a fixed nut 8 co-acts with said threaded portion 7 so that, by rotating the nut 8, the pin 5 and pivot $f$ can be moved toward and away from the grinding disk. This construction also permits of the lever $a$ with its tool-box $p$ being swung over upon the pin 5 as on a pivot to leave the grinding disk clear when this is required for other purposes than grinding tools. In the construction illustrated in Figs. 5, 6 and 7, I also dispense with the spiral gearing $y$, 4 and connect the spindle $z$ to the pivot $f$, as shown in Fig. 7, and provide said spindle $z$ with a threaded portion 9 with which co-acts a nut 10 mounted in a lug 11 on the lever $a$, said nut 10 being provided with a handle 12 by which it can be rotated. As the spindle $z$ and pivot $f$ are incapable of motion transversely of the grinding disk, rotation of the nut 10 will cause the lever $a$ with its tool-box $p$ to be reciprocated transversely across the cutting edge of the grinding disk.

It will now be seen that, by my invention, I provide a tool-holder in the form of a simple, light and cheap attachment to an ordinary plain grinding machine capable of being readily adjusted to present the tool to the cutting edge of the grinding disk or wheel so as to insure correct and efficient grinding, and which, moreover, can be readily removed from the grinding machine when the same is required for other purposes, or swung over to leave the grinding disk or wheel clear.

What I claim and desire to secure by Letters Patent is:—

1. A tool-holder for tool-grinding machines comprising a table adapted to be supported on the pan of the grinding machine in front of the grinding wheel, a pivot slidably mounted on the table, a lever mounted on the table and adapted to be turned on the pivot, means for reciprocating the lever, and a tool box carried by said lever and adapted to be turned about a second axis substantially parallel to the axis of the pivot.

2. A tool-holder for tool-grinding machines comprising a table adapted to be supported on the pan of the grinding machine in front of the grinding wheel, a pivot slidably mounted on the table, a lever mounted on the table, a bearing on the lever adapted to engage the pivot, means for altering the position of the bearing with regard to the pivot, and a tool box carried by said lever and adapted to be turned about a second axis substantially parallel to the axis of the pivot.

In testimony whereof I have signed my name to this specification in the presence of two subscribing witnesses.

THOMAS LUMSDEN.

Witnesses:
 HERBERT HOWARD,
 GEORGE FORSTER.